| United States Patent [19] | [11] Patent Number: 5,195,087 |
|---|---|
| Bennett et al. | [45] Date of Patent: Mar. 16, 1993 |

[54] TELEPHONE SYSTEM WITH MONITOR ON HOLD FEATURE

[75] Inventors: Raymond W. Bennett, Naperville; Joseph G. Klinger, Waterman, both of Ill.

[73] Assignee: AT&T Bell Laboratories, Murray Hill, N.J.

[21] Appl. No.: 912,064

[22] Filed: Jul. 7, 1992

Related U.S. Application Data

[63] Continuation of Ser. No. 576,541, Aug. 31, 1990, abandoned.

[51] Int. Cl.$^5$ ............................ H04J 3/12; H04M 3/42
[52] U.S. Cl. .................................. 370/62; 370/110.1; 379/202; 379/387
[58] Field of Search ..................... 370/58.1, 58.2, 58.3, 370/62, 66, 67, 110.1; 379/67, 88, 93, 94, 158, 161, 202, 204, 205, 206, 215, 217, 387

[56] References Cited

U.S. PATENT DOCUMENTS

| | | | |
|---|---|---|---|
| 3,294,922 | 12/1966 | Schneider et al. | 379/201 |
| 4,399,532 | 8/1983 | Marschner et al. | 370/62 |
| 4,446,554 | 5/1984 | Webber | 370/62 |
| 4,720,848 | 1/1988 | Akiyama | 379/88 |
| 4,890,314 | 12/1989 | Judd et al. | 379/53 |
| 4,899,358 | 2/1990 | Blakley | 379/215 |
| 4,922,490 | 5/1990 | Blakley | 370/110.1 |
| 4,998,243 | 3/1991 | Kao | 370/62 |

*Primary Examiner*—Douglas W. Olms
*Assistant Examiner*—Alpus H. Hsu
*Attorney, Agent, or Firm*—R. T. Watland; M. B. Johannesen

[57] ABSTRACT

An arrangement providing a monitor-on-hold feature for telephone station apparatus. The exemplary apparatus includes a handset transmitter and receiver, a speaker, and four user control buttons. A user is given the capability to move a connection for a first call from the handset to the speaker by simply actuating one of the buttons, the PRIVACY button. A connection is thereafter completed to the handset to answer a second call in privacy by actuating a second button, the NEW-CALL button, while continuing to monitor the first call via the speaker. The capability to move connections is provided by a microprocessor-controlled switch included within the apparatus to selectively interconnect the two communications channels used for the two calls, with the handset and the speaker. Alternatively, the moving of connections is effected within the switching system serving the telephone station.

21 Claims, 8 Drawing Sheets

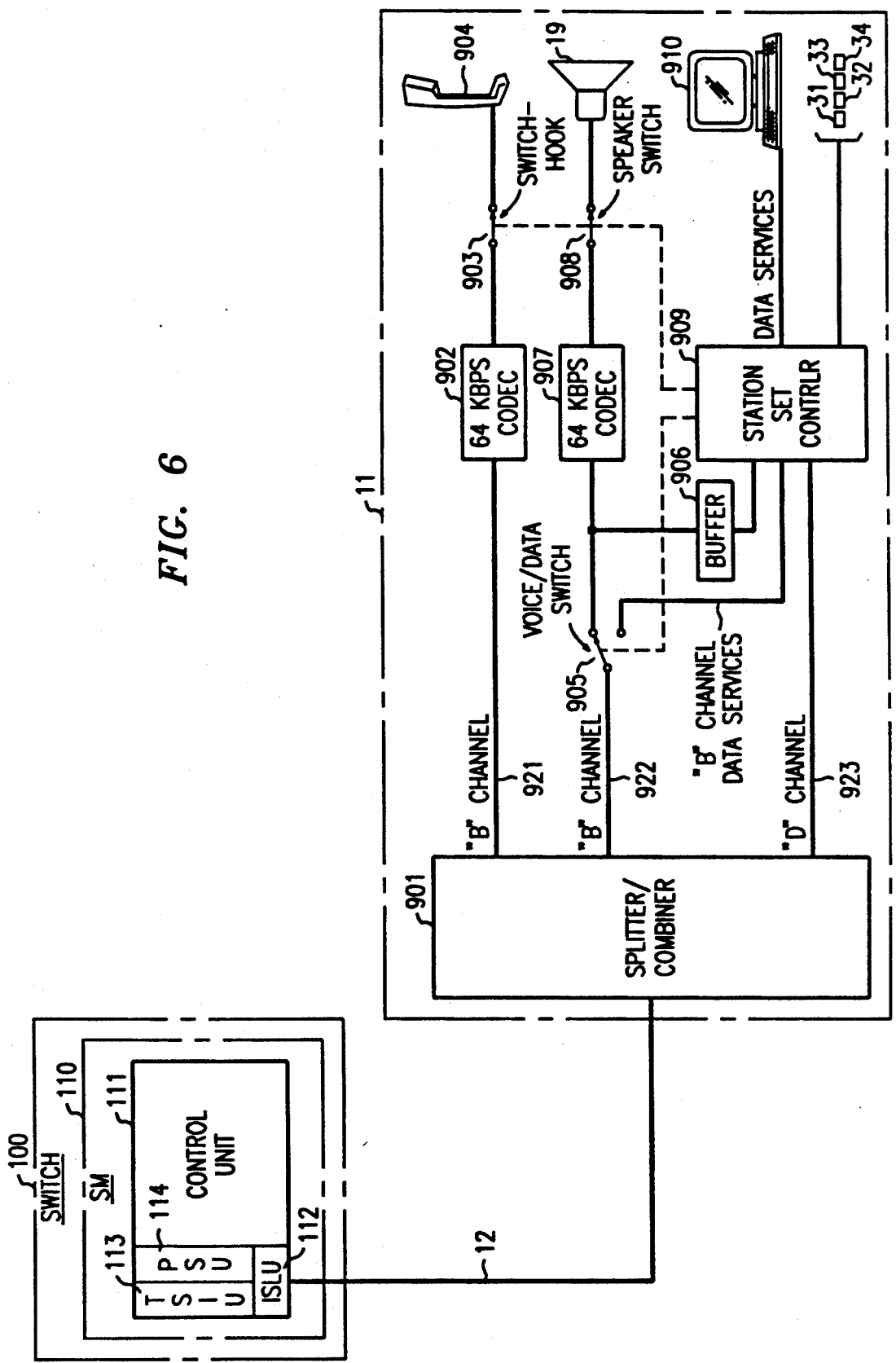

TELEPHONE SYSTEM WITH MONITOR ON HOLD FEATURE

This application is a continuation of application Ser. No. 07/576,541, filed on Aug. 31, 1990, now abandoned.

TECHNICAL FIELD

The present invention relates to an improved telephone system, and more specifically, to an improved telephone system that provides a monitor on hold feature.

BACKGROUND OF THE INVENTION

Modern telephones and telephone switching systems provide a wealth of services or features beyond plain old telephone service ("POTS"). Features such as call hold, call waiting, three-way calling and the like have been available to office and home telephone users for many years. Many offices and homes subscribe to at least one of these features, and often more than one.

As a first step to using features, the user generally places a call on hold. A problem in the art is that a user cannot monitor the call on hold. Not hearing the call on hold often makes the user uncomfortable, or possibly even causes the user to forget about the call. Further, there are often several steps generally involving the switch hook which must be performed to put a call on hold and retrieve it. As a result, these features are not exploited to the fullest potential by the user, even though the user subscribes to these features. Being able to monitor a call on hold, and to put a call on hold with a minimum number of steps, is therefore highly desirable in the art.

In an operator position equipment arrangement disclosed in U.S. Pat. No. 3,294,922, issued to E. W. Schneider et al. on Dec. 27, 1966, an operator has the capability of monitoring one operator position while conversing on another. A headphone set is provided with two receivers that are selectably connectable to "home" and "mate" operator positions, and a transmitter that is connectable to one of the operator positions. The Schneider patent does not, however, disclose an arrangement where the operator moves a first call from one headphone receiver to the other to allow the operator to answer a second call in privacy while continuing to monitor the first call.

In a call-waiting announcement arrangement disclosed in U.S. Pat. No. 4,922,490 issued to J. R. Blakley on May 1, 1990, a calling party's name is announced electronically over a speaker in the telephone station set without disconnecting an established call. The station set is an integrated services digital network (ISDN) speaker phone set connectable to an ISDN switching system via a digital subscriber line having two B-channels and a D-channel. In response to a message transmitted from the switching system on the D-channel, the ISDN speaker phone set connects the speaker to a B-channel and announces call waiting identity information while an established call continues on the other B-channel connected to the handset. The Blakley arrangement does not provide for connection of the second call to the station set so that the two calls are connected simultaneously. The Blakley arrangement further does not provide the capability to change connections readily under the control of the user such that the first call is moved to the speaker and the second call is then connected to the handset so that the user may monitor the first call while conversing privately on the second.

In view of the foregoing, a recognized problem in the art is the absence of a telephone system that allows a customer to conveniently answer a second call in privacy while continuing to monitor a first call.

SUMMARY OF THE INVENTION

This problem is solved and a technical advance is achieved in accordance with the principles of the invention in an exemplary method and structural embodiment that provides a monitor-on-hold feature for telephone station apparatus, illustratively including a handset transmitter and receiver, a speaker, and four user control buttons, where a user is given the capability to move a connection for a first call from the handset to the speaker by simply actuating one of the buttons, the PRIVACY button, and to thereafter complete a connection to the handset to answer a second call in privacy by actuating a second button, the NEWCALL button, while continuing to monitor the first call via the speaker. The capability to move connections is provided, for example, by a microprocessor-controlled switch included within the apparatus to selectively interconnect the two communications channels used for the two calls, with the handset and the speaker. Alternatively, the moving of connections is effected within the switching system serving the telephone station.

A method in accordance with the invention provides a monitor-on-hold feature for telephone station apparatus. The apparatus includes a first audio means, e.g., a handset, that transmits and receives audible voice communication, and a second audio means, e.g., a speaker, that also transmits audible voice communication. The station apparatus is connectable to two communication channels. In the method of the invention, a first one of the channels is connected to the first audio means for a first telephone call. In response to a first user action, e.g., actuation of the PRIVACY button, the first channel is disconnected from the first audio means and instead connected to the second audio means to monitor the first call. Then, during the continued monitoring of the first call, a second user action, e.g., actuation of the NEWCALL button, connects the second channel to the first audio means for a second telephone call.

Illustratively, actuation of an EXCHANGE button results in the two connections being exchanged, i.e., the first channel is again connected to the first audio means and the second channel is connected to the second audio means. Alternatively, a second actuation of the PRIVACY button causes the first channel to be moved from the second audio means back to the first audio means to combine the first and second calls for a conference call. A third actuation of the PRIVACY button causes the first and second channels to be moved from the first audio means to the second audio means to monitor both the first and second calls.

In a first exemplary embodiment (FIG. 4), a telephone station set is connectable to first and second communication channels. The set include NEWCALL and PRIVACY user control buttons, first and second switch-hook relays connected to the first and second communication channels, respectively, and first and second hybrid circuits connected to first and second communication channels, respectively, to interface the first and second communication channels to first and second signal paths. The first and second signal paths are connected to a switch matrix which interconnects the first and second signal paths to a handset and a speaker. A controller is also provided which controls the switch-hook relay and the switch matrix. The controller is responsive to the PRIVACY button during the off-hook state on the first communication channel for a first call for disconnecting the first communication channel from the handset and connecting the first communication channel the speaker to monitor the first call. The controller is also responsive to the NEWCALL button for connecting the handset to the second communication channel and for changing the state of the switch-hook relay to off-hook to establish a second call.

In a second exemplary embodiment (FIG. 5), a teleconferencing system is connectable to a plurality of communication channels. The teleconferencing system includes NEWCALL and PRIVACY buttons. The teleconferencing system further includes a converter for interfacing the plurality of communication channels to a plurality of communication paths. The communications paths are connected to a switching matrix for selectively connecting the communication paths to a speaker or set of speakers and a microphone and to a second speaker. Also included is a controller for controlling the converter and switch matrix responsive to the PRIVACY button when a selected group of the plurality of communication channels are connected to the first speaker and the microphone as a first conference call, to disconnect the selected group of communication channels from the first speaker and microphone and to connect the selected group to the second speaker. The controller is responsive to the NEWCALL button during the monitoring of the first conference call to connect a least a further one of the communication channels to the first speaker and the microphone and to control the converter to establish a second call.

In a third exemplary embodiment (FIG. 6), a combination of an ISDN switching system, including a switching system controller, and an ISDN telephone station set are connected via a digital subscriber line comprising first and second B-channels and a D-channel. The ISDN telephone station set includes NEWCALL and PRIVACY buttons. The ISDN telephone station set also includes a splitter/combiner circuit for digitally interfacing the first and second B-channels and the D-channel of the digital subscriber line with a first B-channel path, a second B-channel path and a D-channel path, respectively. First and second coder/decoders convert digital voice signals received from the first and second B-channel paths to analog voice signals. A handset is connected to the first B-channel path and a speaker is connectable by way of a switch to the second B-channel path. A controller is responsive to actuation of the PRIVACY button during a first telephone call comprising a connection from the switching system to the handset via the first B-channel, the splitter/combiner, first B-channel path and the first coder/decoder. The controller also connects the speaker switch and sends a message to the switching system on the D-channel. In response to the message, the switching system controller causes the switching system to route the first telephone call to the speaker via the second B-channel, the splitter/combiner, the second coder/decoder and the second B-channel path to monitor the first call. The station set controller is responsive to the NEWCALL button for sending a second message to the switching system on the D-channel. The switching system controller, in response to the second message, causes the switching system to connect the first B-channel to the handset as a second telephone call.

BRIEF DESCRIPTION OF THE DRAWING

FIG. 6 is a block diagram of an ISDN telephone station set and an ISDN switching system according to a third exemplary embodiment of this invention as shown in FIG. 1 incorporating the monitor-on-hold feature.

DETAILED DESCRIPTION

Figure 1:
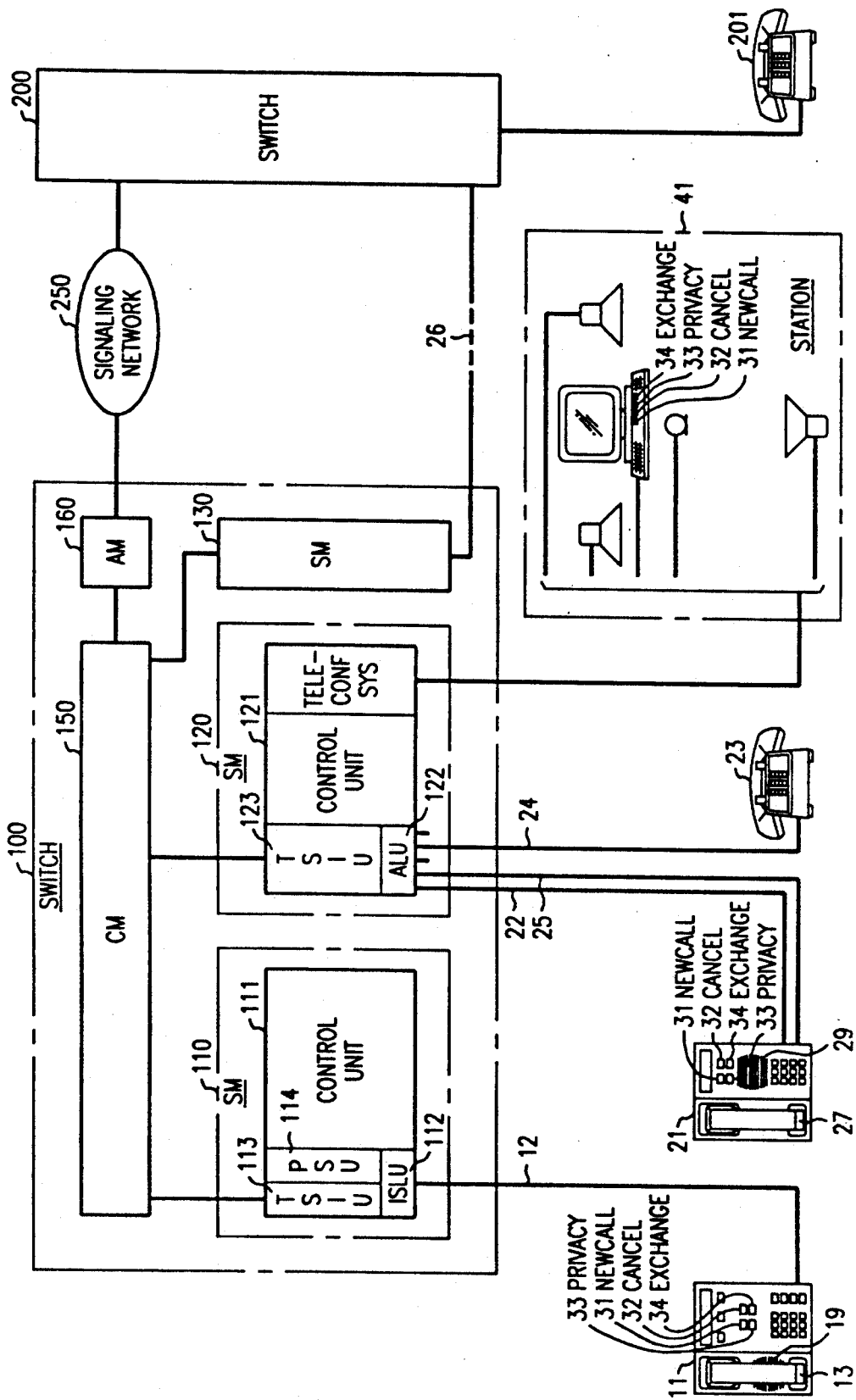
FIG. 1 is a block diagram of a switching network configuration including three exemplary embodiments of a monitor on hold arrangement and illustrative connecting station in accordance with the invention.

An exemplary monitor on-hold arrangement is described herein in the context of the switching network configuration of FIG. 1, having two central office switches 100 and 200, an inter-switch signaling network 250, e.g., a CCS7 network and illustrative communication stations including conventional analog or digital stations 23 and 201, an integrated services digital network (ISDN) speakerphone station 11, an analog station 21 with a supplemental speaker arrangement that is specially adapted for providing monitor-on-hold and a teleconference system 41 adapted to provide monitor-on-hold. Switches 100 and 200 are interconnected by a communication path 26 which may include intermediate switches.

Illustratively, switch 100 is a distributed control, ISDN switching system such as the system disclosed in U.S. Pat. No. 4,592,048 issued to M. W. Beckner et al., on May 27, 1986. Alternatively, switch 100 may be a distributed control, analog or digital switch such as a 5ESS® switch as described in the November, 1981 Bell Laboratories Record at page 258 and the December, 1981 Bell Laboratories Record at page 290, and manufactured by AT&T Technologies, Inc. This invention will be described in connection with an ISDN switch so that embodiments including an ISDN telephone station set incorporating this invention and an analog station set incorporating this invention may be described.

An integrated services digital network (ISDN) is defined as a network that provides end-to-end digital connectivity to support a wide range of services, including voice and non-voice services, to which users have access by a limited set of standard multipurpose customer interfaces. Switch 100 includes a number of switching modules (SMs) each associated with a different subset of stations or trunks. Each switching module includes a control unit for controlling connections to and from its associated stations or trunks. Switching module 110, for example, includes control unit 111 for controlling connections to and from station 11. Similarly, switching module 120 includes control unit 121 for controlling connections to and from telephone station sets 21 and 23.

The architecture of switch 100 has communication module (CM) 150 as a hub, with the switching modules (SMs) 110, 120, and 130, and an administrative module (AM) 160 emanating therefrom. Switching module 110 includes an integrated services line unit (ISLU) 112 which terminates the digital subscriber lines, e.g., 12, and provides access to a time-slot interchange unit (TSIU) 113 and a packet switching unit (PSU) 114. TSIU 113 and PSU 114 respectively provide circuit-switched and packet-switched connections to and from the associated station 11 under the control of control unit 111.

Switching module 120 includes an analog line unit (ALU) 122 which terminates conventional analog lines, e.g., 22, 24, and 25 and provides access to a TSIU 123. TSIU 123 provides circuit-switched connections to and from the associated stations 21 and 23 under the control of control unit 121. Switching module 130 is similar to switching modules 110 and 120 but, rather than line units, includes the appropriate analog or digital trunk unit (not shown) for interfacing with the outgoing trunk included in communication path 26 to switch 200.

Each analog station set communicates with switch 100 on one or more tip-ring pairs as is known in the art. In first exemplary embodiment of this invention, two analog lines 22 and 25 are used for station 21 and connected at ALU 122 as "hunted" pairs, that is, if a new call is placed to station 21 and line 22 is busy, switch 100 connects the new call to line 25. In a second exemplary embodiment of this invention, a teleconferencing system 41 according to this embodiment is connected to a switch at the control unit 121 of the SM 120 and connects to a plurality of lines (channels). Each line is a member of a multiline hunt group, wherein the switch attempts to connect a new call to each line sequentially until an idle line is located as is known in the art. The teleconference system is connected to SM 120 by control lines and analog lines as is also known in the art.

A third exemplary embodiment of this invention discloses a combination of an ISDN station set 11 and control unit 111 which provides a monitor on hold feature. Each ISDN station communicates with switch 100 in two 64 kilobits per second channels referred to an B-channels and in one 16 kilobits per second channel referred to as a D-channel. Each of the B-channels is usable to convey digitized voice samples at the rate of 8000, eight-bit samples per second or data a rate of 64 kilobits per second. The D-channel is used both to convey signaling packets to effect message signaling between ISDN stations and switching module control units, and to convey data packets between different ISDN stations.

In the third exemplary embodiment, information is conveyed between ISDN station 11 and switch 100 using a four-wire, digital subscriber line (DSL) 12 using one pair of wires for each direction of transmission. DSL 12 transmits a serial bit stream at the rate of 192 kilobits per second which comprises 144 kilobits per second for the above-mentioned two 64 kilobits per second B-channels and one 16-kilobits per second D-channel and which further comprises 48 kilobits per second used for a number of functions including framing, DC balancing, control and maintenance. DSL 12 represents what is referred to by the International Telegraph and Telephone Consultative Committee (CCITT) as the T-interface. The use of the T-interface is only exemplary, however, as the invention is equally applicable to systems using other access methods.

Signaling packets are conveyed between ISDN stations and the switching module control units enclosed in level 2 (link-level) frames in accordance, for example, with the standard LAPD protocol. The exemplary signaling messages used for the control of circuit-switched voice calls are in accordance with CCITT recommendation Q.931.

Communications module 150 includes a time-shared, space-division switch or time-multiplexed switch, that provides 64 kilobits per second circuit-switched paths between switching modules. It supports B-channel traffic between switching modules, as well as packet traffic between PSUs in different switching modules. The switching module control unit provides call processing and overall control and maintenance functions for the switching module. Switching module control units in different switching modules communicate with each other and with the administrative module 160 through a message switch (not shown) in the communications module, using an internal message protocol. The architecture provides flexibility in placing specific processing functions in specific processing elements. The general strategy is to place much of the required processing capability in the switching module control units, but to reserve the administrative module for those functions that are inherently centralized. The call processing functions can for example be distributed in a number of ways. In one alternative, most of the call processing functions are placed in the switching module control units with routing, terminal hunting, and path hunt functions located in the administrative module. In another alternative, all call processing functions are placed in the switching module control units, with the administrative module reserved for truly administrative processing.

To complete the description of FIG. 1, switch 200 is shown connected to a conventional analog station 201 used, for purposes of illustration, as the originating station in the examples described herein. The architecture of switch 200 and the types of stations served by switch 200 are not important to the present invention and are not described further herein.

A monitor on hold feature is achieved either in the SM or in the telephone station set. First an embodiment with a monitor-on-hold feature incorporated in an analog telephone station set 21 is described. Analog station set 21 is connected to switch 100 by two analog subscriber channels 22, 25 comprising tip-ring pairs, as known in the art. Telephone station set 21 includes a handset 27, four signaling buttons 31-34 and a speaker 29 separate from handset 27. Speaker 29 is shown as a part of telephone station set 21 in this illustration, but may also be separate from telephone station set 21 without departing from the scope of this invention. Alternatively, both channels are delivered to handset 27 or speaker 29 simultaneously. In this alternative, one channel is provided with voice signals from the handset and the other channel is not.

Signaling buttons 31-34 generate four different signals in this embodiment of this invention. The four signaling buttons are labeled to represent their respective functions. A first signaling button is exemplarily labered "NEWCALL" 31 and gives a first signal to the system. "NEWCALL" 31 is used to signal the system to initiate or answer a call. A second signaling button is exemplarily labeled "CANCEL" 32 and gives a second signal to the system. "CANCEL" 32 is used to signal the system to drop one or more calls. A third signaling button is exemplarily labeled "PRIVACY" 33 and gives a third signal to the system. "PRIVACY" 33 is used to signal the system to change the connection of a call from the handset 27 to speaker 29 or vice-versa. A fourth button is labeled "EXCHANGE" 34 and gives a third signal to the system. "EXCHANGE" 34 is used to signal the system to cause a call connected to handset 27 to be disconnected from handset 27 and connected to speaker 29, and simultaneously cause a call connected to speaker 29 to be disconnected from speaker 29 and connected to handset 27. Alternatively, each signal may be initiated by using the switch hook, keypad, or dualtone multifrequency tone as known in the art. However, in order to achieve relative clarity in operation, and hence make these features more usable, four signaling buttons are used in connection with the embodiments.

An example of the function of the buttons will now be described. In this example, telephone station set 21 is connected to telephone 201 by way of switches 100 and 200 as a first telephone call. A second call to telephone station set 21 is initiated by telephone 23, whereupon control unit 121 determines that line 22 is busy with the first call. In response to determining that line 22 is busy, control unit 121 determines that line 22 is part of a hunt group and that line 25 is also a member of the hunt group. Control unit 121 next determines whether line 25 is busy. Since line 25 is not busy, a "ring" signal is sent to telephone station set 21 on line 25. The user of telephone station set 21 hears the ringing, decides to answer the second call privately, and signals the system by pressing the "PRIVACY" button 33. The first call on line 22 is disconnected from handset 27 and connected to speaker 29. The user then presses "NEWCALL" button 31 which causes telephone station set 21 to connect the second call on line 25 to handset 27. In this way the user of telephone station set 21 may monitor the first call on line 22 while conversing on the second call on line 25.

Alternatively, the monitor on hold feature may be implemented in switch 100. This alternate embodiment will be described in connection with ISDN telephone 11, but it will be apparent to one skilled in the art that the following description could apply with little modification to non-ISDN telephone systems ISDN telephone 11 includes a handset 13, four signaling buttons 31-34, and a speaker 19 separate from handset 13. In this embodiment, ISDN telephone 11 is connected through switch 100, signaling network 250 and switch 200 to telephone 201 on a first call. When a second call arrives from, for example, telephone 23, the second call may be announced by synthesizing the calling party name as described in U.S. Pat. No. 4,922,490 issued to Blakley and assigned to the assignee of this invention. The ISDN user decides to answer the second call privately and signals switch 100 by pressing a "PRIVACY" button 33. In response, switch 100 causes the first call to be routed to speaker 19. The user signals switch 100 again by pressing the "NEWCALL" button 31 and in response switch 100 routes the second call to handset 13. In this manner the user may monitor one call while simultaneously conversing on another call.

Figure 2:
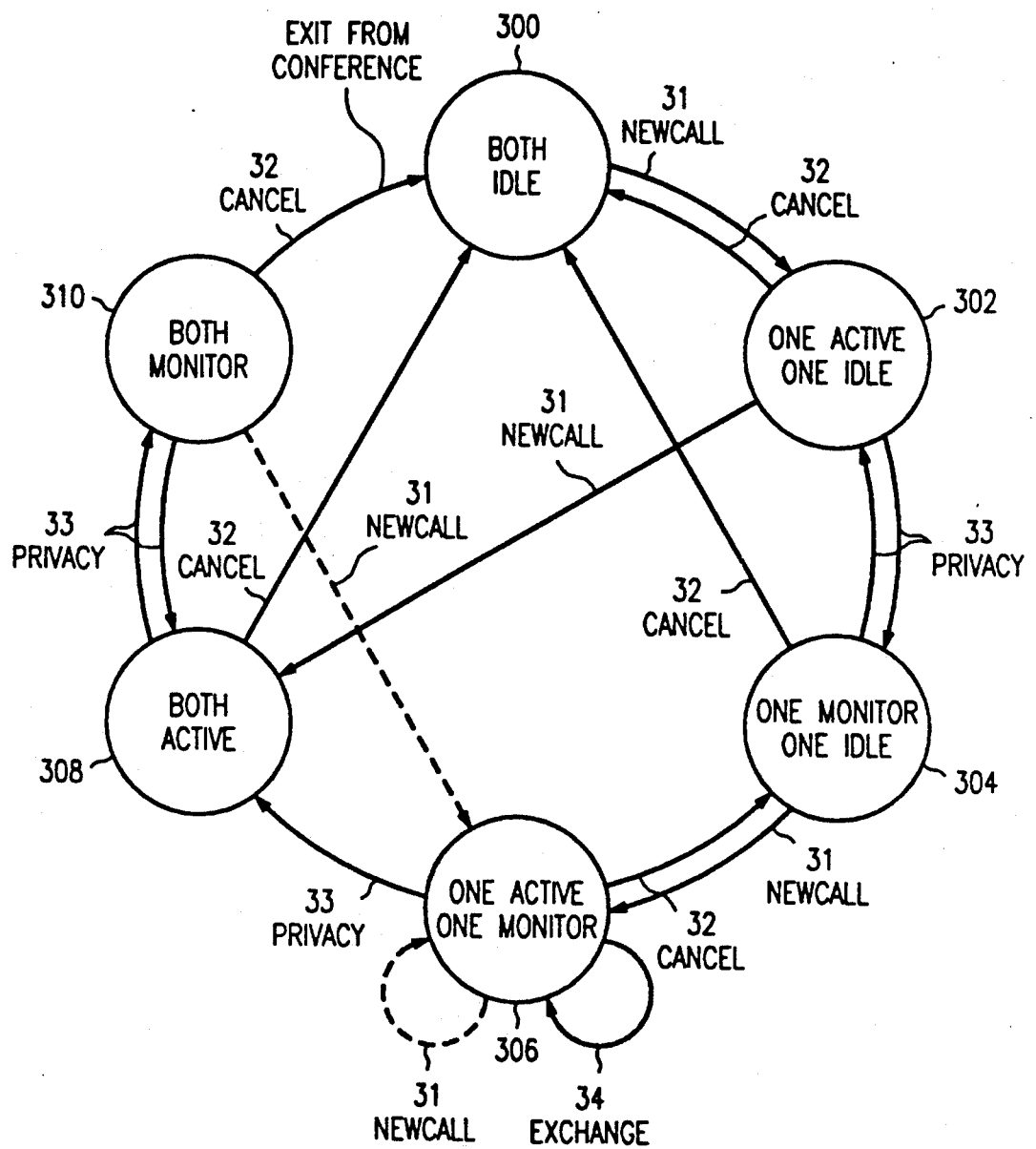
FIG. 2 is a diagram of the permitted call states of the preferred embodiment of this invention.

Turning now to FIG. 2, a state diagram of the permitted states of the telephone calls according to this embodiment is shown. The method of this embodiment can be represented by six permitted stable states as in states 300-310. The call processing for monitor-on-hold transitions from one state to another state in response to the signaling buttons 31-34. Four signals as shown in FIG. 2 were chosen to keep the number of buttons or actions required to utilize this feature to a minimum. If a signal is received that does not cause a valid transition from a particular state, the signal is ignored.

The state diagram is described in connection with a two channel (analog or dual B channel ISDN) telephone station set. For those embodiments with more than two channels (for example, a teleconferencing station set as described in connection with FIG. 4), additional transitions are shown in broken lines.

Starting with state 300, a state is shown where both channels are idle. There is one permitted transition from state 300. "NEWCALL" 31 causes a transition to state 302, where one channel is active and one channel is idle. There are two permitted transitions from state 302. "CANCEL" 32 causes a transition from state 302 back to state 300. "NEWCALL" 31 causes a transition from state 302 to state 308, where both channels are active. "PRIVACY" 33 causes a transition to state 304 where one channel is idle and one channel is monitored.

Continuing clockwise around the circle of states, in state 304 one channel is monitored and one channel is idle. In state 304, the active channel is connected to speaker 29. From state 304 there are three transitions. "NEWCALL" 31 causes a transition to state 306 where one channel is active and one channel is monitored. "CANCEL" 32 causes a transition to the idle state 300, and "PRIVACY" 33 causes a transition back to state 302.

In state 306 one channel is active and one channel is monitored. There are four permitted transitions from state 306. "CANCEL" 32 causes a transition from state 306 back to state 304. "PRIVACY" 33 causes a transition from state 306 to state 308 where both channels are active, i.e., in conference mode. "EXCHANGE" 34 causes an exchange of the monitored and the active connection. State 306 is the only state where "EXCHANGE" 34 causes a transition. If there are more than two channels available, "NEWCALL" causes a transition to a many active, one on monitor state 306.

State 308 is a stable three-way call or "conference" state where both channels are connected to the handset. There are two valid transitions from state 308. "CANCEL" 32 causes a transition from the both active state to the both idle state 300. "PRIVACY" 33 causes a transition from the both active state to the both monitored state 310, that is, both channels are disconnected from the handset and both channels are connected to the speaker.

State 310 is a stable state where both (all) channels are being monitored and no channel has an active voice path. There are two transitions from state 310. "CANCEL" 32 causes a transition to the idle state 300. "PRIVACY" 33 causes a transition back to the both active state 308. In a teleconferencing system where there are more than two channels, "NEWCALL" 31 causes a transition to the one active, the rest on monitor state 306.

Turning now to FIGS. 3A through 3F, a flowchart depicting the processing involved in transitioning from one state to another as described in connection with FIG. 2. Starting with FIG. 3A, processing begins in the idle state 300. A check is made in decision diamond 310 if "NEWCALL" 31 has been received. If "NEW- CALL" 31 has not been received in decision diamond 310, the program returns to the idle state 300.

If "NEWCALL" 31 has been received in decision diamond 310, processing continues to action block 320. In action block 320 a connection is made between the handset and a first channel, and an off-hook signal is given to the network.

Processing continues to action block 330 where digits are collected and delivered to switch 100. Processing continues from action block 330 to decision diamond 340. A test is made in decision diamond 340 to determine if "CANCEL" 32 has been received. If "CANCEL" 32 has been received, the call has been abandoned and the program returns to the idle state 300. If "CANCEL" 32 has not been received in decision diamond 340 then the program continues through connector B, to FIG. 3B.

Figure 3A:
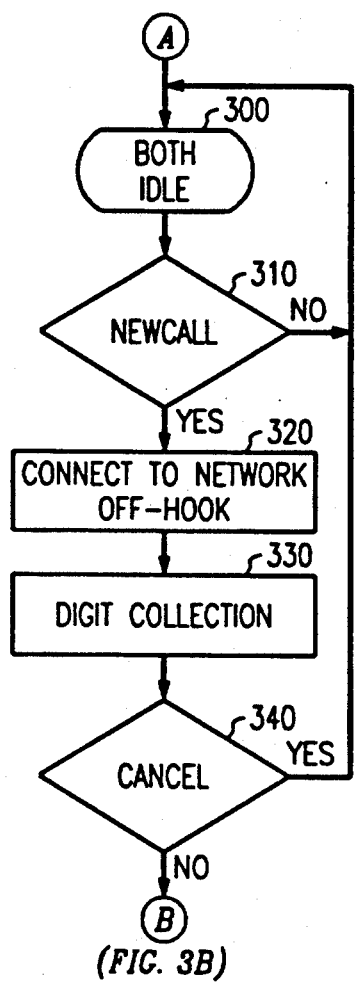
FIGS. 3A-F are flowcharts of the control of a telephone call in the preferred embodiment of the present invention.
Figure 3B:
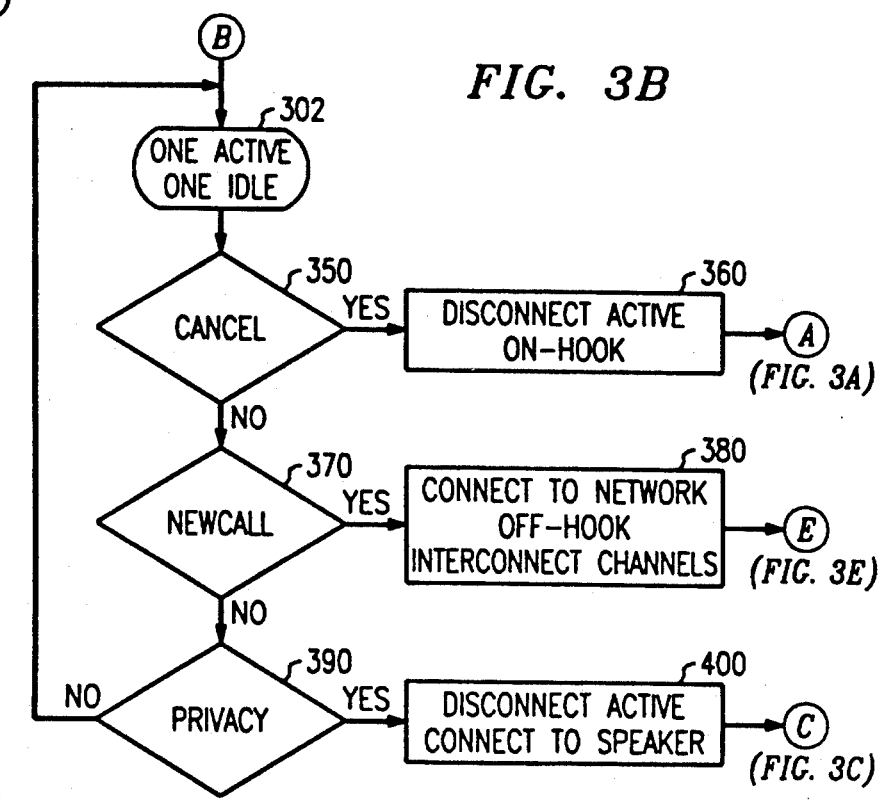

Turning now to FIG. 3B, a stable one active/one idle state is shown in state 302. Processing continues to decision diamond 350. If "CANCEL" 32 has been received in decision diamond 350, then in action box 360 the handset is disconnected from the first channel and an idle indication is sent on the network. Processing continues through connector A to the idle state 300 in FIG. 3A. If "CANCEL" 32 has not been received in decision diamond 350, processing continues to decision diamond 370 where a test is made whether "NEWCALL" 31 has been received. If "NEWCALL" 31 has been received, in decision diamond 370, processing continues in action block 380 where a connection is made between the handset and the idle channel, and an off-hook indication is given to switch 100 for the idle channel. Processing continues through connector E to state 308.

If "NEWCALL" 31 has not been received in decision diamond 370, processing continues to decision diamond 390. In decision diamond 390 a test is made if "PRIVACY" 33 has been received. If "PRIVACY" 33 has not been received in decision diamond 390, the process loops back to the one active/one idle state 302. If "PRIVACY" 33 has been received in decision diamond 390, then processing continues to action block 400. In action block 400 the first channel is disconnected from the monitor speaker and both channels are connected to the handset. Processing then continues through connector C to the one monitor/one idle state 304.

Figure 3C:
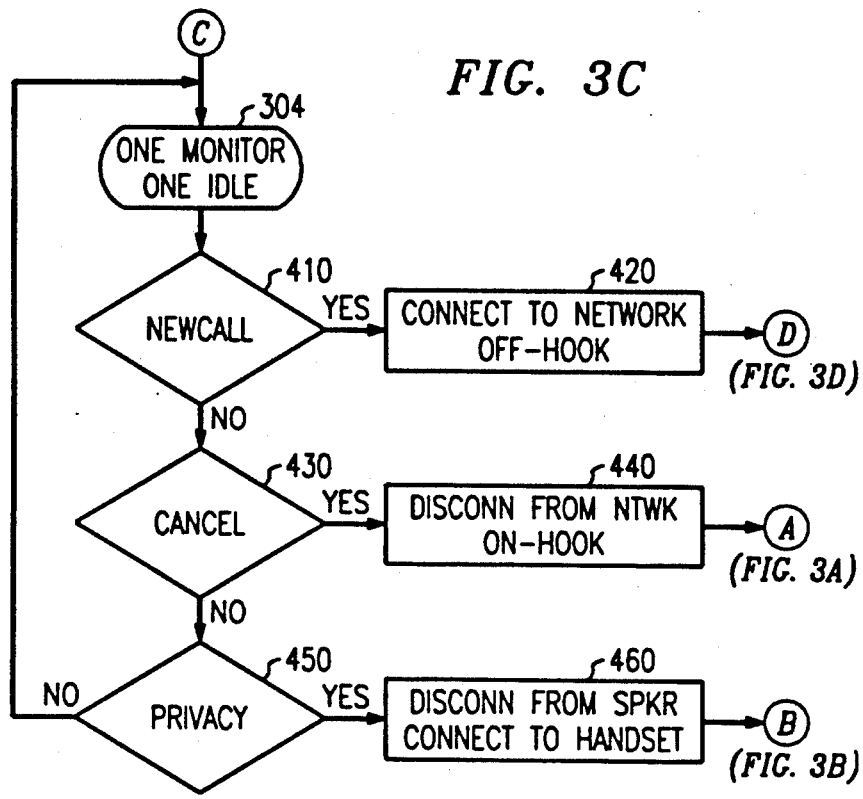

Turning now to FIG. 3C, the processing and connections are shown for one channel on monitor and one channel on idle state 304. A test is made in decision diamond 410 to determine whether "NEWCALL" 31 has been received. If "NEWCALL" 31 has been received in decision diamond 410 then in action box 420 the idle channel is connected to the handset and an off-hook indication is given to the network. Processing continues through connector D to the one active/one monitor state.

If "NEWCALL" 31 has not been received in decision diamond 410, processing continues to decision diamond 430 where a check is made to determine whether "CANCEL" 32 has been received. If "CANCEL" 32 has been received, then processing continues to action block 440 where the first channel is disconnected from the monitor speaker, and an on-hook indication is given on the first channel. Processing continues through connector A to idle state 300.

If "CANCEL" 32 has not been received in decision diamond 430, then processing continues to decision diamond 450, where a check is made to determine if "PRIVACY" 33 has been received. If "PRIVACY" 33 has been received in decision diamond 450, then processing continues to action block 460 where in response the first channel is disconnected from the monitor speaker, and the first channel is connected to the handset. Processing continues through connector B to the one active/one idle state 302. If "PRIVACY" 33 has not been received in decision diamond 450, processing loops back to state 304.

Figure 3D:
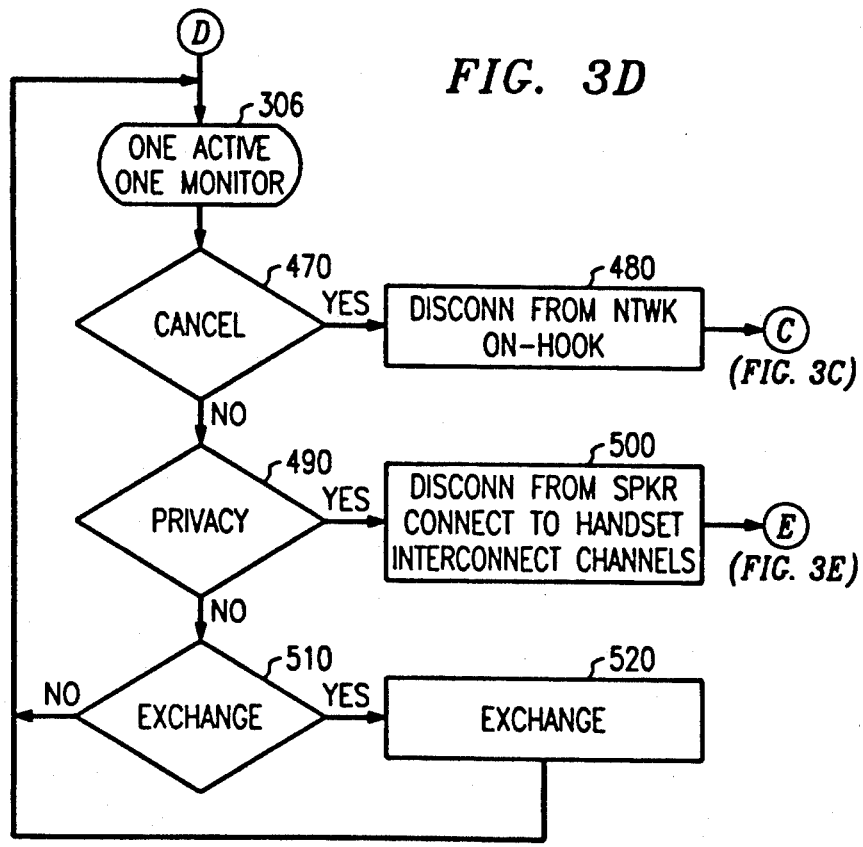

Turning now to FIG. 3D, the state with one channel active, one channel on monitor, is shown in state 306. Processing continues to decision diamond 470. If "CANCEL" 32 has been received in decision diamond 470 processing continues to action box 480 where, in response, the second channel is disconnected from the handset and an idle indication is given to the network. Processing continues from box 480 to connector C to the one monitor/one idle state 304.

If "CANCEL" 32 has not been received in decision diamond 470, processing continues to decision diamond 490. In decision diamond 490 a check is made if "PRIVACY" 33 has been received. If "PRIVACY" 33 has been received, processing continues to action block 500 where the first channel is disconnected from the monitor speaker and both channels are connected to the handset. Processing continues from action block 500 through connector E to the both active state 308.

If "PRIVACY" 33 has not been received in decision diamond 490, processing continues to decision diamond 510. In decision diamond 510, a test is made if "EXCHANGE" 34 has been received. If "EXCHANGE" 34 has been received in decision diamond 510, then processing continues to action block 520 where the second and first channels are disconnected from the handset and the monitor speaker respectively and reconnected to the monitor speaker and the handset. Processing continues back to the one active/one monitor state 306. If "EXCHANGE" 34 is not received in decision diamond 510, processing continues back to one active/one monitor state 306.

Figure 3E:
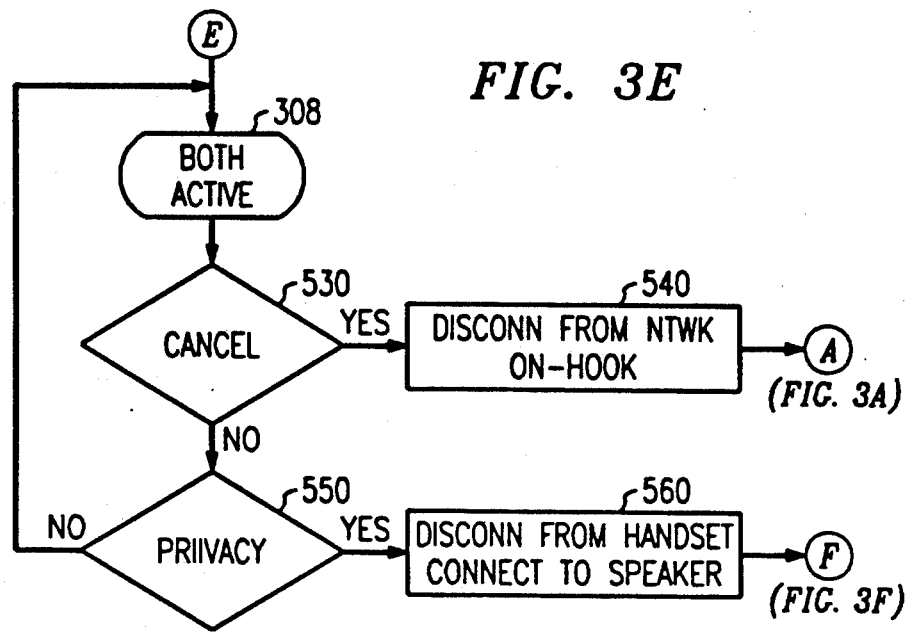

Turning now to FIG. 3E, processing of the both active state 308 is shown. Processing proceeds to decision diamond 530 where a test is made if "CANCEL" 32 has been received. If "CANCEL" 32 has been received in decision diamond 530, then in response processing proceeds to action block 540 where both channels are disconnected from the handset and both channels are given an on-hook indication to the network. Processing continues through connector A back to the both idle state 300.

If "CANCEL" 32 has not been received in decision diamond 530, then processing continues to decision diamond 550 where a check is made if "PRIVACY" 33 has been received. If "PRIVACY" 33 has been received in decision diamond 550, then processing proceeds to action block 560 where both channels are disconnected from the handset and both channels are connected to the monitor speaker. Processing proceeds from action block 560 through connector F, to the both monitor state 310.

Figure 3F:
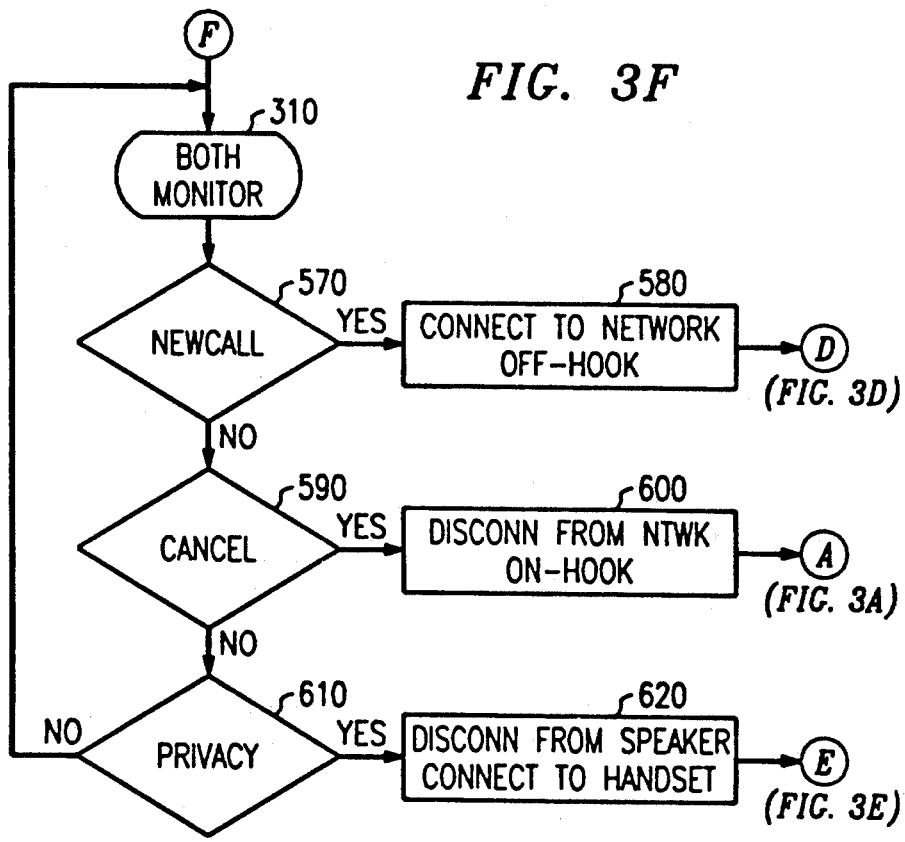

Proceeding now to FIG. 3F, the processing for the state 310 is shown Processing proceeds to decision diamond 570 where, in a more than two-line case, a test is made whether "NEWCALL" 31 has been received. If "NEWCALL" 31 has been received, then a further line is connected to the handset and given an off-hook indication to the network. Processing continues through connector D which is the one active/one monitor state 306. If "NEWCALL" 31 has not been received in decision diamond 570, processing continues to decision diamond 580 where a check is made whether "CANCEL" 32 has been received. If "CANCEL" 32 has been received in decision diamond 580, then processing proceeds to box 600 where, in response, both channels are disconnected from the monitor speaker and both channels are given an idle or on-hook indication to the network. Processing continues through connector A to the both idle state 300.

If "CANCEL" 32 has not been received in decision diamond 590, processing proceeds to decision diamond 610 where a check is made for receipt of "PRIVACY" 33. If "PRIVACY" 33 has been received in decision diamond 610 then processing proceeds to action block 620 where both or all connections are disconnected from the monitor speaker and connected to the handset. Processing proceeds through connector E to the both active state 308. If "PRIVACY" 33 has not been received in decision diamond 610, then processing returns to the both monitor state 310.

Figure 4:
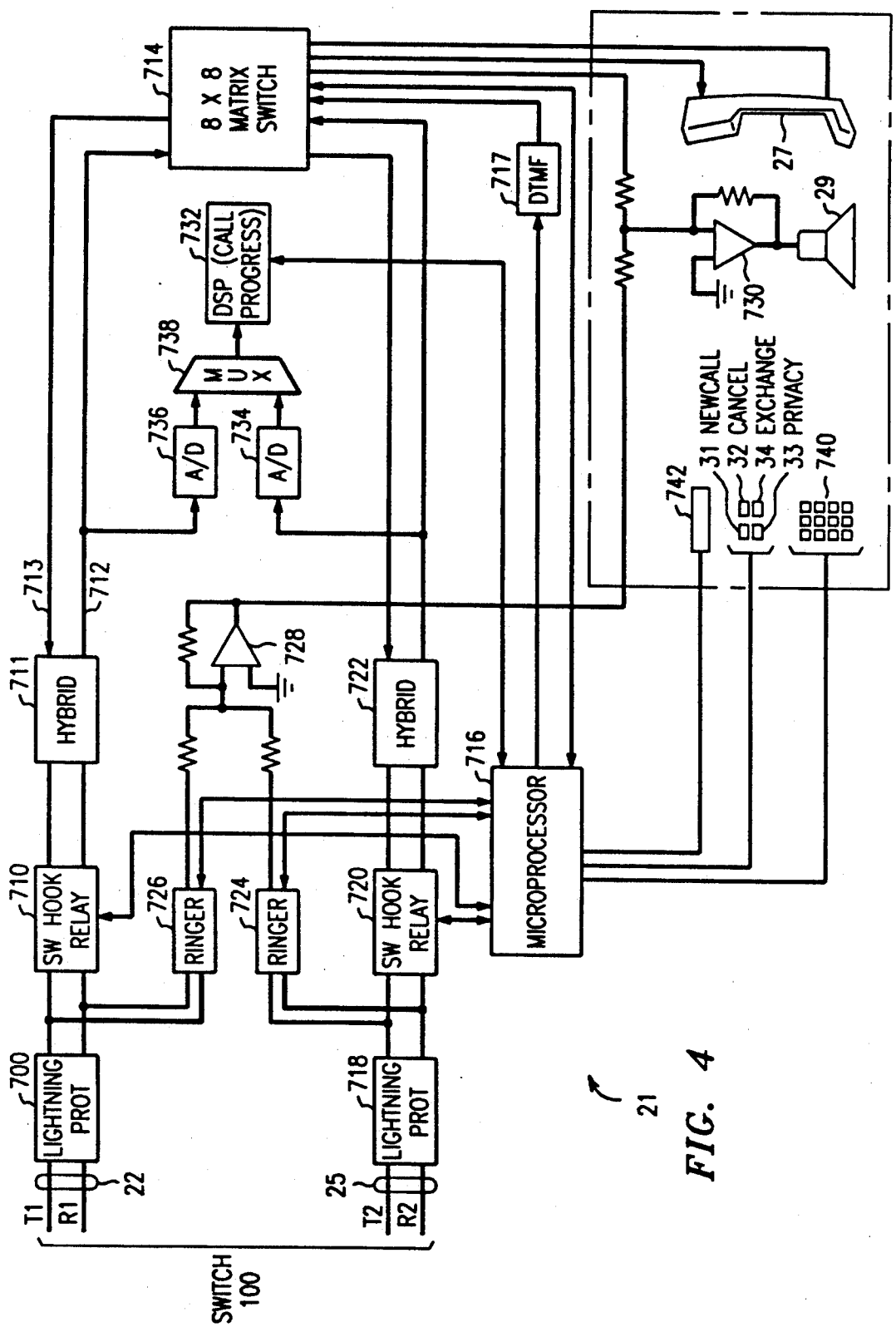
FIG. 4 is a block diagram of a telephone station set according to a first exemplary embodiment of this invention as shown in FIG. 1 incorporating the monitor-on-hold feature.

Turning now to FIG. 4 a block diagram of the main components of a telephone station set 21 according to an embodiment of this invention is shown wherein a monitor-on-hold feature is implemented in the station set. Two subscriber channels 22 and 25 connect telephone station set 10 to switch 100. In this embodiment of the invention, subscriber channels 22 and 25 are analog two-wire (tip and ring) channels as is common in the art. The two subscriber channels 22 and 25 are hunted by switch 100, that is, when switch 100 attempts to route a call to a first subscriber channel, and that subscriber channel is busy, the call is routed to the other subscriber channel.

For example, telephone station set 21 is connected through switch 100 and switch 200 to telephone 201 (as in FIG. 1). Tip-ring pair 22 delivers signals through lighting protection device 700 and switch hook relay 710. Switch hook relay 710 provides an off-hook indication to the network for channel 22. Signals are delivered from switch hook relay 710 to a two-wire to four-wire converter circuit or hybrid 711. Hybrid 711 converts tip and ring (a full duplex connection to the telephone network), to a receive audio path 712 and a transmit audio path 713. Receive audio path 712 and transmit audio path 713 are connected to the inputs and outputs of an 8×8 matrix switch 714 respectively. Signals are delivered from matrix switch 714 to the handset earpiece and signals are received from the handset microphone and delivered back through the circuit to channel 22.

Switch hook relay 710 provides on-hook and off-hook indication to the network under control of microprocessor 716. Microprocessor 716 also controls matrix switch 714 to deliver signals selectively from channels 22 and 25 to the handset 27 and/or speaker 29 and to channel 22 and/or 25 from the handset microphone. Microprocessor 716 further controls DTMF generator 717 to provide the full range of tones used in telephony.

To continue the example from FIG. 1 next, telephone 23 attempts to connect to (calls) telephone 21. Switch 100 determines that channel 22 is busy, and "hunts" channel 25. Switch 100 detects an on-hook indication at switch hook relay 720. Switch 100 then applies ringing signal to channel 25 and through lighting protection circuit 718.

The ringing signal is delivered from the tip and ring pair on channel 25 to a ringer circuit 724. Ringer circuit 724 provides an indication of an incoming call to microprocessor 716, and provides audible signals which are adjustable and programmable by the microprocessor 716. (Channel 22 includes a similarly configured ringer circuit 726.) The audible signals from ringer circuits 724 and 726 are summed at summing amplifier 728. The output of the summing amplifier 728 is delivered to a further summing amplifier 730 and an audible signal of a new call is given through speaker 29.

The user then decides whether to answer the call as a three-way call or to answer the call privately. To answer the call as a three-way call, the user presses "NEWCALL" button 31. In response, microprocessor 716 configures matrix switch 714 to deliver the incoming signals from both channels 22 and 25 to handset 27 and to deliver the outgoing signals from handset 27 to both channels 22 and 25. Matrix switch 714 also interconnects the channels so that all parties are connected. Microprocessor 716 then causes switch hook relay 720 to change to the off-hook state.

If the user prefers to answer the new call in private, the user first presses the "PRIVACY" button 33. In response to "PRIVACY" 33, microprocessor 716 configures matrix switch 714 to deliver incoming signals from channel 22 to speaker 29. The user then presses a "NEWCALL" button 36. In response to the "NEWCALL" button 31, microprocessor 716 configures matrix switch 714 to connect channel 25 signals from switch hook relay 720 through hybrid circuit 722 to the input side of matrix switch 714. Matrix switch 714 delivers the signals to handset 27 and receive signals from handset 27 and delivers the received signals to channel 25. Microprocessor 716 also causes switch hook relay 720 to give an off-hook indication to switch 100.

Alternatively, if the user had previously placed a call on monitor, as above, the user may initiate a new call. To this end, the user would press "NEW CALL" button 31. In response, microprocessor 716 configures matrix switch 714 to receive and deliver signals from channel 25 to and from handset 27, and causes switch hook relay 720 to provide an off-hook indication to switch 100. The user enters digits at keypad 740 which are collected by microprocessor 716. Microprocessor 716 transmits the collected digits through matrix switch 714, and channel 25, as is known in the art.

Call processing monitoring is provided by a digital signal processor 732. Digital signal processor 732 is manufactured by AT&T as part number DSP16. A connection is made to the incoming line after hybrid circuits 711 and 722. Digital bit streams from both channels, if present, are converted in analog-to-digital converters 734 and 736, multiplexed by multiplexer 738 and delivered to a serial port of digital signal processor 732. Digital signal processor 732 provides call progress monitoring to microprocessor 716, as is well known in the art.

In this embodiment of this invention, an 16 by 40 LCD display 742 is attached to microprocessor 716 through display drivers (not shown) as known in the art. Display 742 labels signaling buttons 31–34 and/or provides a small display for using telephone station set 21 as a terminal. Display 742 could also be a small CRT or other means as known in the art.

Figure 5:
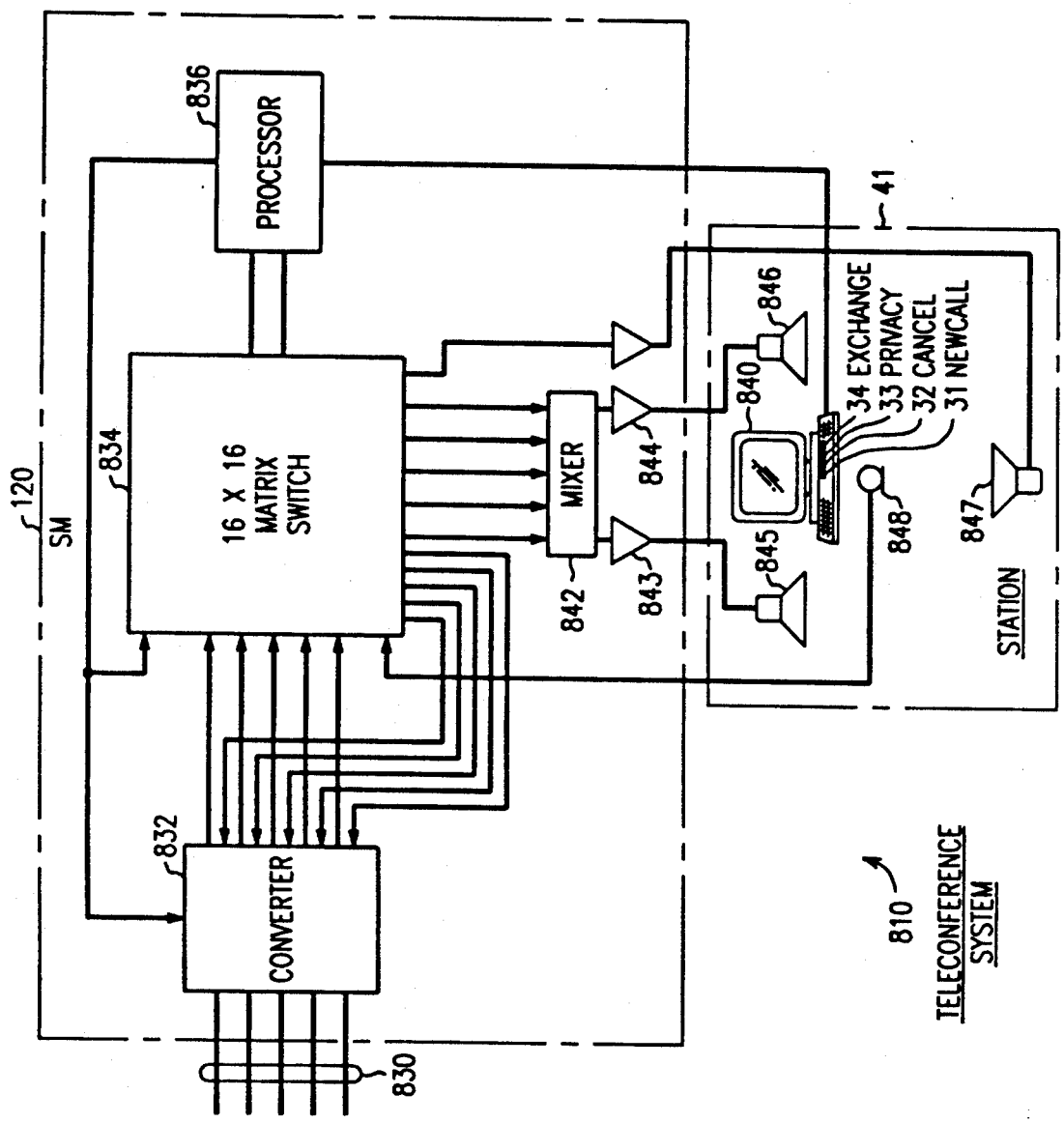
FIG. 5 is a block diagram of the major components of a teleconferencing system according to a second exemplary embodiment of this invention as shown in FIG. 1 incorporating the monitor-on-hold feature.

Turning now to FIG. 5 a block diagram of the main components of a teleconferencing system 41 built according to the present embodiment is shown. Teleconferencing system 41 may be a stand-alone unit, or may be implemented in SM 120 of switch 100. If teleconferencing system 41 is implemented in SM 120, only communication and control lines run from SM 120 to a conference room. Alternatively, if teleconferencing system 41 is implemented as a standalone unit, communication channels 830 connect to a SM, such as SM 120 (FIG. 1) or may be private lines.

Teleconferencing system 41 according to this embodiment is connected to other station sets by communication channels 830. In one embodiment, communication channels 830 comprise 70 ohm coaxial cable. However, communication channels 830 could also be conventional analog or digital telephone lines, ISDN links, or optical fiber connectors. Communication channels 830 are part of a multiline hunt group, as described above. Communication channels 830 are interfaced into the teleconferencing system 41 by converter circuit 832 which segregates the incoming signals from the outgoing signals for each line or channel. Converter circuit 832 is appropriate for the type of communication channels 830 used. For example, in the embodiment where 70 ohm cable is used, converter 832 is a mixer/splitter with signal amplifiers and support circuitry as is known in the art.

For purposes of this example, teleconferencing station set 41 is connected to three other conferees via three of the channels 830. Two other channels 830 are idle. Converter circuit 832 receives signals from communication channels 830 and converts them into appropriate analog signals, and delivers the analog signals to a matrix switch 834. Matrix switch 834 in this embodiment is a 16×16 crosspoint array. Matrix switch 834 delivers the audio signal to a stereo mixer 842, which reduces the incoming analog signals to two channels, and provides volume balancing to synthesize localization information. The signals are amplified in amplifiers 843 and 844, and delivered to left 845 and right 846 channel speakers. In this manner, each incoming voice appears to be originating in a different location in front of the user. Outgoing audio signals from the user are picked up by microphone 848 and delivered to matrix switch 834. Matrix switch 834 delivers the outgoing analog signal to each of currently connected channels 830 through converter 832 and interconnects all currently connected channels 830.

Matrix 834 and converter 832 are controlled by processor 836 which delivers commands via bus 837. Processor 836 is controlled by the user by terminal 840 and signal buttons 31–34. Processor 836 alerts the user of incoming calls by sending an indication on terminal 840, or causing an audible signal to be generated at terminal 840, or both.

If for example, the user is involved in a conference on three channels as described above, and desires to make an additional call in private, the user presses "PRIVACY" button 33, which causes processor 836 to configure matrix switch 834 to deliver the three incoming signals to speaker 847. Speaker 847 is shown in FIG. 5 as physically behind the user. The user then presses "NEWCALL" button 31 and a path is configured by processor 836 at matrix switch 834, between speakers 845 and 846 and microphone 848, and an unused channel 830. In this manner, the user may monitor the conference on speaker 846 while conversing privately on microphone 848 and speakers 845 and 846. The user may join the conferees, make additional new calls, etc., as described above in connection with FIGS. 2 and 3.

FIG. 6 is a block diagram of ISDN speakerphone station 11. The two B-channels and the D-channel on digital subscriber line 12 are demultiplexed onto separate paths 921, 922, and 923 by a splitter/combiner 901. In the present illustrative embodiment, the 64 kilobits per second B-channel on path 921 is used exclusively for conveying digitized speech signals. The digital signals are converted to analog speech signals by a 64 kilobits per second coder/decoder (codec) 902 and are transmitted via a switch 903 to the receiver of handset 904 for audible speech reception. In the reverse direction, the analog speech signals generated from audible speech by the transmitter of handset 904 are transmitted via switch 903 for coding by codec 902 into a 64 kilobits per second digitized speech signal on path 921. The B-channel or path 921 is multiplexed onto DSL 12 by splitter/combiner 901.

In the present embodiment, the 64 kilobits per second B-channel on path 922 is used for either voice or data depending on the position of a voice/data switch 905. Voice signals on path 922 are used for monitor on hold. When switch 905 is positioned to connect path 922 with a codec 907, digitized speech signals on path 922 are converted to analog signals by codec 907. When a speaker switch 908, operated under the control of a station set controller 909, connects codec 907 to speaker 19, the analog speech signals generated by codec 907 are transmitted to speaker 19 for audible speech transmission. When B-channel path 922 is not being used for monitor on hold, it may be used to convey digital data to a data terminal 910, via voice/data switch 905 operated under the control of station set controller 909.

The D-channel on path 923 is used for user packet data and for control communication between station set controller 909 and control unit 111 (FIG. 1).

The operation of ISDN station 11 for monitor-on-hold is now described. For example, a call is connected on B channel 921 to handset 904. If another call arrives at switch 100 for ISDN station set 11, switch 100 sends a message to station set controller 909 through D channel 923. Station set controller 909 causes a ringing signal to be delivered to speaker 19. The user then decides whether to answer the call as a three-way call or to answer the call privately. To answer the call as a three-way call, the user presses the "NEWCALL" button 31. In response, station set controller 909 formats and sends a message to switch 100 over D channel 923. In response to the message, switch 100 connects the paths and that connection is extended over B channel 921 to handset 904 as a three-way call, as known in the art.

If the user prefers to answer the new call in private, the user first presses "PRIVACY" button 33. In response, station set controller 909 formats and sends a message to switch 100, and closes speaker switch 908. In response to the message from station set 11, switch 100 delivers incoming signals from the first call through B channel 922 to speaker 19.

The user then presses "NEWCALL" button 31 and, in response, the station set controller 909 formats and sends a message on D channel 923 to switch 100. In response to the message, switch 100 delivers the audio signals from the incoming call through B channel 921 and codec 902 to handset 904.

Alternatively, if the user had previously placed a call on monitor, as above, the user may initiate a new call. To this end, the user presses "NEWCALL" button 31. In response, station set controller 909 formats and sends a message on D channel 923 to switch 100, and closes speaker switch 908. In response to the message, switch 100 delivers the existing call to B channel 922, and delivers dial tone through B channel 921 to handset 904. Digits are collected and transmitted to the switch by station set controller 909, and call processing proceeds as is known in the art.

It is to be understood that the above-described embodiments are merely illustrative principles of the invention and that many variations may be devised by those skilled in the art without departing from the spirit and scope of the invention. It is therefore intended that such variations be included within the scope of the claims.

We claim:

1. A method of providing a monitor-on-hold feature for a telephone station apparatus comprising a handset for transmitting and receiving audible voice communication and a speaker physically isolated from said handset for transmitting to a user audible voice communication, but incapable of receiving audible voice communication from said user, said apparatus being connectable to two communication channels, said method comprising
    connecting a first one of said channels to said handset for a first telephone call,
    in response to a first user action, disconnecting said first channel from said handset and connecting said first channel to said speaker to monitor said first call, and
    in response to a second user action during the continued monitoring of said first call, connecting a second one of said channels to said handset for a second telephone call.

2. A method in accordance with claim 1 further comprising
    in response to a third user action during the continued monitoring of said first call and after connecting said second channel to said handset, disconnecting said first channel from said speaker and connecting said first channel to said handset to combine said first and second calls for a conference call.

3. A method in accordance with claim 2 further comprising
    in response to a fourth user action after combining said first and second calls for said conference call, disconnecting said first and second channels from said handset and connecting said first and second channels to said speaker to monitor both of said first and second calls.

4. A method in accordance with claim 1 further comprising
    in response to a third user action during the continued monitoring of said first call and after connecting said second channel to said handset, exchanging connections such that said first channel is connected to said handset for said first call and said second channel is connected to said speaker to monitor said second call.

5. A method in accordance with claim 1 wherein said monitored first call is an established call between at least two other station sets.

6. A method in accordance with claim 1 wherein said apparatus is connected via said two communication channels to a switching system, said method further comprising
    said switching system directing said second call to said apparatus in response to receipt of a directory number assigned to a user of said apparatus.

7. A method in accordance with claim 1 wherein said channels are included in a switching system and said connecting and disconnecting of said channels are performed by said switching system.

8. Telephone station set apparatus connectable to two subscriber channels, said apparatus comprising
    a handset means for transmitting and receiving audible voice communication,
    a speaker physically isolated from said handset means for transmitting to a user audible voice communication said speaker being incapable of receiving audible voice communication from said user,
    switch means for selectively interconnecting said first and second channels with said handset means and said speaker, and
    control means responsive to user actions for controlling the selective interconnections effected by said switch means,
    said control means being responsive to a first user action when a first one of said channels is connected by said switch means to said handset means for a first telephone call, for controlling said switch means to disconnect said first channel from said handset means and to connect said first channel to said speaker to monitor said first call,
    said control means being further responsive to a second user action during the continued monitoring of said first call, for controlling said switch means to connect a second one of said channels to said handset means for a second telephone call.

9. Apparatus in accordance with claim 8, said control means being further responsive to a third user action during the continued monitoring of said first call and after connection by said switch means of said second channel to said handset means, for controlling said switch means to disconnect said first channel from said speaker and to connect said first channel to said handset means to combine said first and second calls for a conference call.

10. Apparatus in accordance with claim 9, said control means being further responsive to a fourth user action after combining said first and second calls for said conference call, for controlling said switch means to disconnect said first and second channels from said handset means and to connect said first and second channels to said speaker to monitor both of said first and second calls.

11. Apparatus in accordance with claim 8, said control means being further responsive to a third user action during the continued monitoring of said first call and after connection by said switch means of said second channel to said handset means, for controlling said switch means to exchange connections such that said first channel is connected to said handset means for said first call and said second channel is connected to said speaker to monitor said second call.

12. Apparatus in accordance with claim 8 wherein said monitored first call is an established call between at least two other station sets.

13. Apparatus in accordance with claim 8 further comprising first and second buttons, wherein said control means comprises a microprocessor responsive to actuation of said first and second buttons, and wherein said first and second user actions correspond actuation of said first and second buttons respectively.

14. Apparatus in accordance with claim 13 further comprising third and fourth buttons, and wherein said microprocessor is further responsive to actuation of said third button for controlling an exchange of interconnections by said switch means, and responsive to actuation of said fourth button for controlling disconnection by said switch means of at least one connection to said first audio means.

15. Apparatus in accordance with claim 8 wherein said speaker is integral with a telephone station set of said apparatus.

16. Apparatus in accordance with claim 8 wherein said speaker is separate from a telephone station set of said apparatus.

17. A method of controlling the selective interconnection of a plurality of communication channels to a handset and a speaker in a telephone station set, said method comprising in response to a NEWCALL signal from a user, connecting said handset to an idle one of said channels, in response to a PRIVACY signal from said user, moving, to said speaker, the connection of said channels that are connected to said handset, in response to an EXCHANGE signal from said user, exchanging connections such that said channels connected to said handset prior to receipt of said EXCHANGE signal are thereafter connected to said speaker, and such that said channels that are connected to said speaker are thereafter connected to said handset; and in response to a CANCEL signal from said user, disconnecting said handset from at least one of said channels that are connected to said handset prior to receipt of said CANCEL signal.

18. A telephone station set apparatus connectable to first and second communication channels, said apparatus comprising CANCEL, EXCHANGE, NEWCALL and PRIVACY user control buttons, first and second switch-hook means connected to said first and second communication channels, respectively, each of said switch-hook means having on-hook and off-hook states, first and second hybrid means for interfacing said first and second communication channels, respectively, to a first signal path and a second signal path, switching means selectively connecting said first signal path and said second signal path to a first audio means for transmitting and receiving audible voice communication and to a second audio means for transmitting audible voice communication, control means for controlling said first and second switch-hook means and said switching means responsive to said PRIVACY button during the off-hook state on said first communication channel for a first call, for disconnecting said first communication channel from said first audio means and connecting said first communication channel to said second audio means to monitor said first call, said control means further responsive to said NEWCALL button for connecting said first audio means to said second of said communication channels and for changing the state of said switch-hook means of said second communication channel to off-hook to establish a second call, said control means is responsive to said CANCEL button for disconnecting said first audio means; and said control means is responsive to said EXCHANGE button for disconnecting said first communication channel from said second audio means and said second communication channel from said first audio means, and connecting said second communication channel to said second audio means to monitor said second call and connecting said first communication channel to said first audio means for said first call.

19. A combination for providing a monitor-on-hold feature for telephones, said combination comprising an ISDN switching system connected to a telephone network and an ISDN telephone station set, said ISDN switching system responsive to a switching system control means and connected via a digital subscriber line comprising first and second B-channels and a D-channel to said ISDN telephone station set, said ISDN telephone station set including NEWCALL and PRIVACY user control buttons, splitter/combiner means for digitally interfacing said first and second B-channels and said D-channel of said digital subscriber line with a first B-channel path, a second B-channel path, and a D-channel path, respectively, a first coder/decoder for converting between digital voice signals, received from said first B-channel via said splitter/combiner means and said first B-channel path, and analog voice signals, a second coder/decoder for converting between digital voice signals, received from said second B-channel via said splitter/combiner means and said second B-channel path, and analog voice signals, first audio means connectable to said first B-channel path for audibly transmitting and receiving voice communication, second audio means connectable to said second B-channel path for audibly receiving voice communication, speaker switch means having a first position for selectably connecting said second audio means to said second B-channel and a second position disconnecting said second audio means from said second B-channel, and station set controller means responsive to actuation of said PRIVACY button during a first telephone call comprising a connection from said switching system to said first audio means via said first B-channel, said splitter/combiner means, said first B-channel path and said first coder/decoder, for placing said speaker switch means in said first position and sending a message to said switching system on said D-channel via said D-channel path, said splitter/combiner means and said D-channel to said switching system control means, said switching system control means responsive to said message for controlling said switching system to route said first call to said second audio means of said station set via said second B-channel, said splitter/combiner means, said second coder/decoder, and said second B-channel path to monitor said first call, said station set controller means further responsive to actuation of said NEWCALL button for sending a second message to said switching system on said D-channel via said D-channel path, said splitter/combiner means and said D-channel to said switching system control means, said switching system control means responsive to said second message for controlling said switching system to connect said first B-channel to said first audio means via said splitter/combiner means, said first coder/decoder, and said first B-channel path as a second call.

20. The combination of claim 19 further including a CANCEL button and wherein said station set controller means is responsive to said CANCEL button for sending a third message to said switching system control means,
said switching system control means responsive to said third message for disconnecting said first audio means.

21. The combination of claim 19 further including an EXCHANGE button and wherein said station set controller means is responsive to said EXCHANGE button for sending a fourth message to said switching system control means,
said switching system control means responsive to said fourth message for disconnecting said first B-channel from said second audio means and said second B-channel from said first audio means, and for connecting said second B-channel to said second audio means to monitor said second call and said first B-channel to said first audio means for said first call.

* * * * *